US012601455B2

(12) United States Patent
Hamar

(10) Patent No.: US 12,601,455 B2
(45) Date of Patent: Apr. 14, 2026

(54) LIGHTING DEVICE FOR A MOTOR VEHICLE

(71) Applicant: ZKW Group GmbH, Wieselburg (AT)

(72) Inventor: Martin Hamar, Olomouc (CZ)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 19/080,201

(22) Filed: Mar. 14, 2025

(65) Prior Publication Data

US 2025/0297716 A1 Sep. 25, 2025

(30) Foreign Application Priority Data

Mar. 21, 2024 (EP) .................................... 24165279

(51) Int. Cl.
*F21S 41/24* (2018.01)
*F21S 41/143* (2018.01)

(52) U.S. Cl.
CPC ............. *F21S 41/24* (2018.01); *F21S 41/143* (2018.01)

(58) Field of Classification Search
CPC ......... F21S 41/24; F21S 41/143; F21S 41/365
See application file for complete search history.

(56) References Cited

U.S. PATENT DOCUMENTS 7,980,742 B2 * 7/2011 Albou .................. F21S 41/365 362/520
10,288,248 B1 * 5/2019 Crespin ................ F21S 41/141
10,451,237 B1 * 10/2019 Zorn ...................... F21S 41/43
11,454,367 B2 * 9/2022 Lim ........................ F21S 41/27
11,572,997 B2 * 2/2023 Berger .................. F21S 41/365
12,241,609 B2 * 3/2025 Jin .......................... F21S 41/26
2006/0285347 A1 * 12/2006 Okada .................. F21S 41/147 362/516
2019/0316749 A1 10/2019 Zorn
2023/0408056 A1 * 12/2023 Ohashi ................. F21S 41/147

FOREIGN PATENT DOCUMENTS

DE 102010018119 A1 10/2011
EP 2390561 B1 1/2018

OTHER PUBLICATIONS

Extended European Search Report of EP Patent Application No. 24165279.1 dated Sep. 9, 2024.

* cited by examiner

*Primary Examiner* — Matthew J. Peerce
(74) *Attorney, Agent, or Firm* — Eversheds Sutherland (US) LLP

(57) ABSTRACT

The invention relates to a lighting device for a motor vehicle, the lighting device including a light source and a transparent light guide body with a light coupling region. Light emitted by the light source passes an edge and is deflected from a first light deflection surface to a second light deflection surface and from there to a light emitting surface. In vertical sections through the light guide body, the first light deflection surface forms a first intersection curve, and the second light deflection surface forms a second intersection curve. The total focal point of the deflection system formed by the first and second deflection surfaces is arranged at the edge or in a region of the edge such that the deflection system consisting of the first and second deflection surfaces projects the light beams emitted by the light source as a light distribution with a cut-off line.

20 Claims, 7 Drawing Sheets

LIGHTING DEVICE FOR A MOTOR VEHICLE

CROSS-REFERENCE TO RELATED APPLICATIONS

This application claims priority to European Patent Application No. 24165279.1, filed Mar. 21, 2024, which is incorporated herein by reference.

TECHNICAL FIELD

The invention relates to a lighting device for a motor vehicle, wherein the lighting device comprises: a light source configured to emit light; a transparent light guide body configured to project light emitted by the light source as a light distribution; and a light coupling region configured to couple light emitted by the light source into the light guide body, wherein the light guide body has a first light deflection surface on an upper side, a second light deflection surface on a lower side and a light emitting surface, wherein light emitted by the light source and coupled into the light guide body via the light coupling region propagates in the light guide body as a first light beam in a first light propagation direction, wherein the light guide body has, for example on a lower side, an edge extending transversely to the first light propagation direction, and wherein after the edge, the light propagates as a second light beam to the first light deflection surface in a second light propagation direction, the second light propagation direction having the same direction as the first light propagation direction, and is deflected from the first light deflection surface as a third light beam to the second light deflection surface and is deflected from the second light deflection surface as a fourth light beam to the light emitting surface, exits via the light emitting surface as a fifth light beam and is projected as a light distribution in an area in front of the light guide body.

TECHNICAL BACKGROUND

Lighting devices for use in a motor vehicle or in a motor vehicle headlight for generating a light distribution are known from the state of the art. Typically, a light source emits light that is coupled into an optical body, for example a light guide body. Such a light guide body is, for example, a body made of an optically transparent material in which the coupled light propagates to a light emitting surface, emerges from the light guide body via the light emitting surface and is emitted into an area in front of the lighting device, in particular in front of the motor vehicle headlamp or in front of the motor vehicle, where a light distribution is projected (i.e., generated or imaged).

A shading element is often provided in the light propagation path, which shades part of the coupled light so that, if the shading element is suitably positioned, its edge is "projected" as a cut-off line limiting the light distribution or becomes visible as a cut-off line. For example, a dipped beam distribution can be created in this way.

The shading element is often designed as an edge in the light guide body that runs transverse to the light propagation path.

To project the light emerging from the light guide body as a light distribution, it is often provided that a projection lens is arranged adjacent to the light emitting surface of the light guide body, which projects (i.e., images) the emitted light as a light distribution. The projection lens is typically arranged at a distance from the light emitting surface.

The disadvantage of such a design is that optical errors, in particular color errors, occur due to the emittance from an optical body into another medium, in particular air, and the re-entry into the projection lens, which are reflected as undesirable optical effects in the light image.

It is also possible for the light emitting surface to be curved in order to perform the function of a projection lens. In this case, the light does not emerge from the light guide body. However, for design reasons, vehicle manufacturers increasingly want the light emitting surfaces of such lighting devices to be planar.

SUMMARY OF THE INVENTION

It is an object of the invention to provide a lighting device with a light guide body in which the disadvantages described above are mitigated or eliminated.

This object is solved with a lighting device described above, in which, according to the invention, in one or more sections through the light guide body along one or more vertical sectional planes which run parallel to the first light propagation direction or parallel to a vertical longitudinal center plane, the first light deflection surface forms a first intersection curve in the sectional plane or planes, and the second light deflection surface forms a second intersection curve, wherein

- the first intersection curve is convexly or concavely curved and has the shape of a branch of a hyperbola, wherein a focal point of the hyperbola lies outside the light guide body, in a region of the light guide body facing away from the second light deflection surface, and wherein
- the second intersection curve is convexly curved and has the shape of a parabola with a focal point, the focal point of the parabola coinciding with the focal point of the first intersection curve lying outside the light guide body in a region of the light guide body facing away from the second light deflection surface,
- and wherein the total focal point of the deflection system formed by the first deflection surface and the second deflection surface is arranged in the sectional plane or planes at the edge or in a region of the edge in such a way that the deflection system consisting of the first and second deflection surfaces projects the light beams emitted by the light source as a light distribution with a cut-off line which limits the light distribution, in particular upwards, wherein the cut-off line, in particular the shape and/or position of the cut-off line, is determined by the edge, and wherein the light emitting surface is planar.

The term "light propagation direction" refers to the resulting direction of the light rays of the respective light beam under consideration.

According to the invention, the two deflection surfaces act together like a projection lens and produce the projection of the desired light image, whereby the light emitting surface of the light guide body can be formed planar, since the imaging function is only realized by the two deflection surfaces (=imaging system, projecting system). Refractive optics can thus be avoided in the imaging system, as the projection is also realized by means of two reflections and the refractive edge is formed within the light guide body or limits the light guide body, but is not outside. Color effects (chromatic aberration) can therefore be avoided with the lighting device according to the invention, with a planar light-emitting surface at the same time.

Further advantageous embodiments of the lighting device are described in the dependent claims.

It may be provided that the edge comprises one or more rectilinear sections, wherein, for example, in the case of two or more rectilinear sections, these are arranged offset with respect to one another in one direction, in particular a vertical direction.

A straight design is a simple realization, offset sections can be used to realize an asymmetry of the cut-off line in the generated light distribution.

Preferably, the edge is curved, wherein preferably the edge stands in a Petzval surface of the deflection system, is tangent to the Petzval surface of the deflection system, or is located in the vicinity of the Petzval surface.

In this context, it may be provided that the edge comprises one or more sections, wherein in the case of two or more sections these are arranged offset to each other in one direction, in particular a vertical direction, again for example to realize an asymmetrical cut-off line in the light distribution, which limits it upwards.

It may be provided that the first intersection curves and/or the second intersection curves have an identical shape in parallel vertical sectional planes.

In other words, the curvature of the first intersection curve always looks the same in several spaced sections, as does the curvature of the second intersection curve. The first and second deflection surfaces or the light guide in this area are thus (mathematically) extruded from a first intersection curve and an intersection section curve in a vertical section.

However, it may also be provided that in parallel vertical sections the first intersection curves and/or the second intersection curves have different shapes, in particular different curvatures, wherein, for example, the first and second deflection surfaces are each formed by rotation of the first and second intersection curves about their respective axis of symmetry.

For example, a vertical intersection curve is assumed, which corresponds to the longitudinal center plane, and the first and second intersection curves are rotated around their respective hyperbola symmetry axis (connection of the two focal points of the hyperbola) or parabola symmetry axis (connecting line of the focal point and vertex of the parabola).

It may be provided that the light coupling region is configured, for example in the form of a collimator, such that the light beams emitted by the light source are substantially aligned in the light guide body in the first light propagation direction, wherein in particular the first light beam is bundled into a region above the edge.

Accordingly, the desired alignment of the light beams coupled into the light guide body is realized by the design of the light coupling region.

The coupled light thus moves in the first light propagation direction, whereby these light beams are preferably bundled, i.e. converge in the direction of the edge. In an ideal, point-shaped light source, it could be provided that the light beams are focused into the edge or into a point located on or close to the edge. However, due to the expansion of the light source in practice, light rays also move past the edge at a distance above the edge. In the light distribution, these beams passing above illuminate the area below or lower in the light distribution; the closer the light beams move past the edge, the higher up these light beams are in the light image. The edge can be recognized in the light image as a cut-off line, which limits the light image towards the top. Since the light beams S1 are bundled and essentially directed towards the edge, the light distribution is brightest in the area of the cut-off line and the highest illuminance values occur there.

It is advantageous if the light coupling region and the light guide body are integrally connected to each other and are preferably formed from the same material.

In order to homogenize the light emerging from the light guide body, cushion optics can be provided on the planar light emitting surface.

Furthermore, the problem is solved with a lighting system comprising two or more lighting devices according to the invention as described above.

For example, it is provided that the two or more lighting devices are arranged laterally next to each other, wherein, for example, the first light propagation directions in the light guide bodies are aligned parallel to each other or are inclined at an angle to each other.

The lighting devices together each generate a light distribution, which together then form the resulting overall light distribution, for example a dipped beam light distribution.

The light sources are preferably arranged in a row, in particular side by side and transverse, in particular normal to a first overall light propagation direction (=resultant from the individual first light propagation directions).

In such a lighting system, the light guide bodies of the lighting devices are preferably integrally connected to each other.

It may be provided that the light guide bodies, for example their light emitting surfaces, open into or form a common, preferably planar, system light emitting surface, wherein the system light emitting surface extends perpendicular to a longitudinal center plane of one of the light guide bodies or obliquely, at an angle, in particular a horizontal angle, not equal to 0° to this longitudinal center plane.

For example, the light emitting surfaces lead into a light conducting, in particular transparent, body that is located in front of the light emitting surfaces, preferably integrally (i.e. in one piece) with the light guide bodies, and which comprises the system light emitting surface opposite the light emitting surfaces.

Furthermore, the invention relates to a headlamp, in particular a motor vehicle headlamp, which comprises one or more lighting devices described above and/or one or more lighting systems described above.

Finally, the invention also relates to a vehicle, in particular a motor vehicle, wherein the vehicle has one or more lighting devices as described above and/or one or more lighting systems as described above and/or one or more headlights as described above.

BRIEF DESCRIPTION OF THE DRAWINGS

The invention is explained in more detail below with reference to exemplary drawings.

DETAILED DESCRIPTION OF EMBODIMENTS

Figure 1:
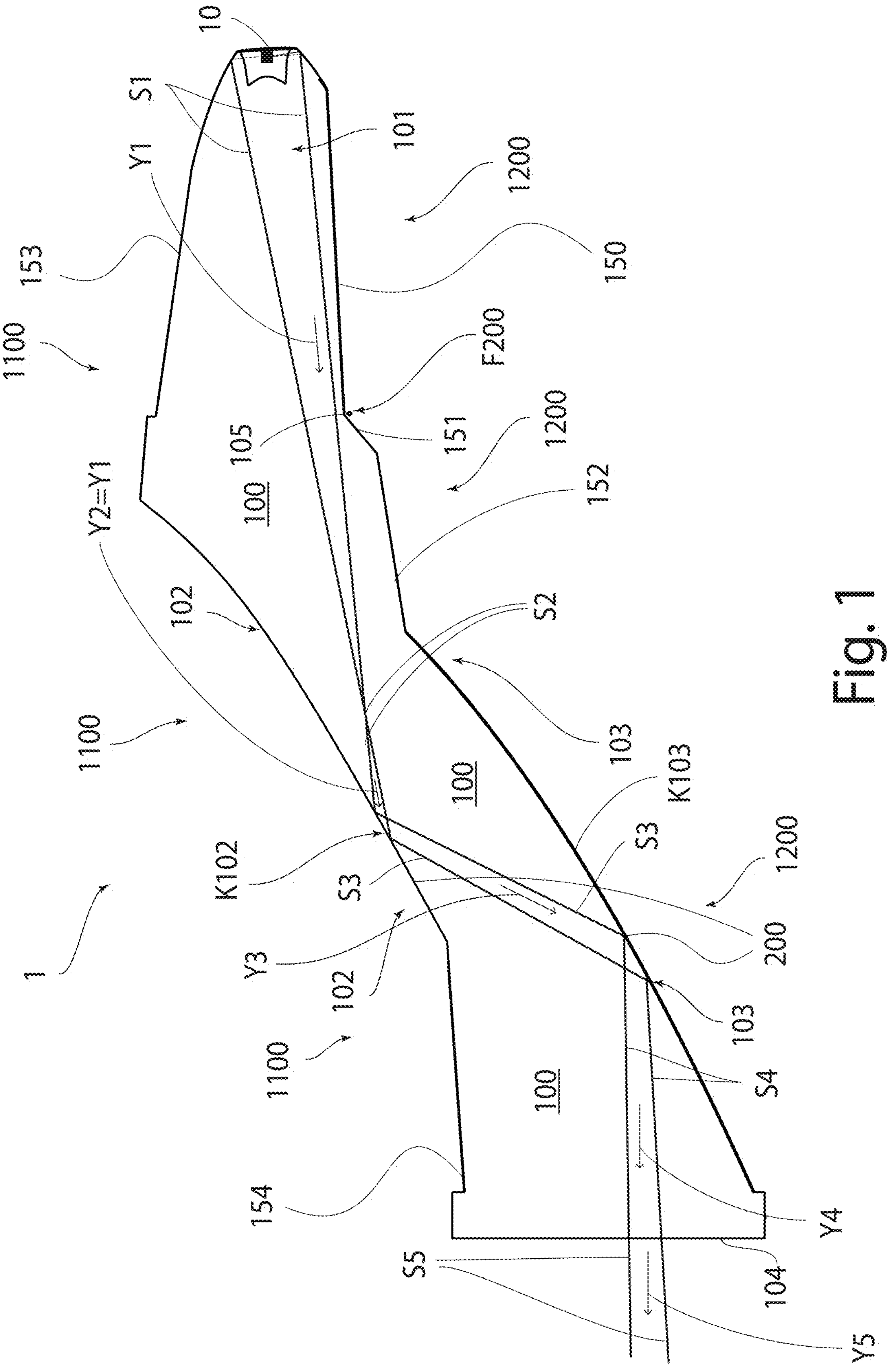
FIG. 1 shows a vertical section of a lighting device according to the invention.
Figure 7:
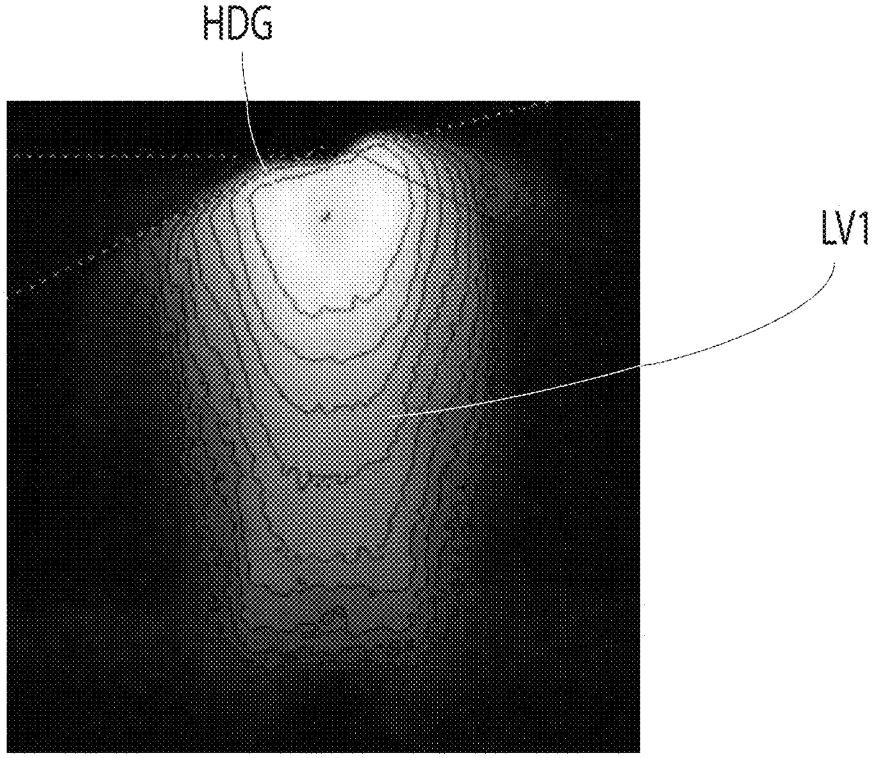
FIG. 7 shows schematically a light distribution generated with a lighting device from FIG. 1 or a single lighting device from FIG. 3 or FIG. 5.

FIG. 1 shows a lighting device 1 in a vertical section, wherein the lighting device comprises a light source 10 which is configured emit light. Furthermore, the lighting device 1 comprises a transparent light guide body 100, which is configured to project (i.e. image) light emitted by the light source 10 as light distribution LV1-LV5. A corresponding light distribution LV1 is shown as an example in FIG. 7.

The light source 10 can be one or more LEDs, for example, but can also be a more complex arrangement of light emitting elements.

The light guide body 100 is a solid body made of a transparent material, for example Tarflon, in which light can propagate in a straight line.

The light guide body 100 has a light coupling region 101, via which the light emitted by the light source 10 is coupled into the light guide body 100. The light coupling region 101 is part of the light guide body 100, or the light guide body 100 and light coupling region 101 form one piece and are made of the same material.

The light guide body 100 has a first light deflection surface 102 on an upper side 1100, a second light deflection surface 103 on a lower side 1200, and a light emitting surface 104.

The light emitting surface 104 is planar.

The terms "upper" and "lower" refer to the proper installation of the lighting device in a motor vehicle.

Light emitted by the light source 10 and coupled into the light guide body 100 via the light coupling region 101 propagates in the light guide body 100 as a first light bundle (light beam S1) in a first light propagation direction Y1.

On a lower side 1200, the light guide body 100 has an edge 105 running transversely, typically at an angle of about 90° to the first light propagation direction Y1. The expression "of about" is intended to express that the edge 105 does not necessarily have to run in a straight line, but can also be curved or is preferably curved, so that the angle between edge 105 and direction Y1 can be locally different.

The vertical sectional plane Ev shown runs perpendicular to the planar light emitting surface 104 and/or parallel to the first light propagation direction Y1. For example, the vertical section Ev is a longitudinal center plane LEM of the light guide body 1. With regard to the designation of the sections and planes, see also FIGS. 4 and 5 with respect to a lighting system comprising a plurality of lighting devices according to the invention.

Figure 1A:
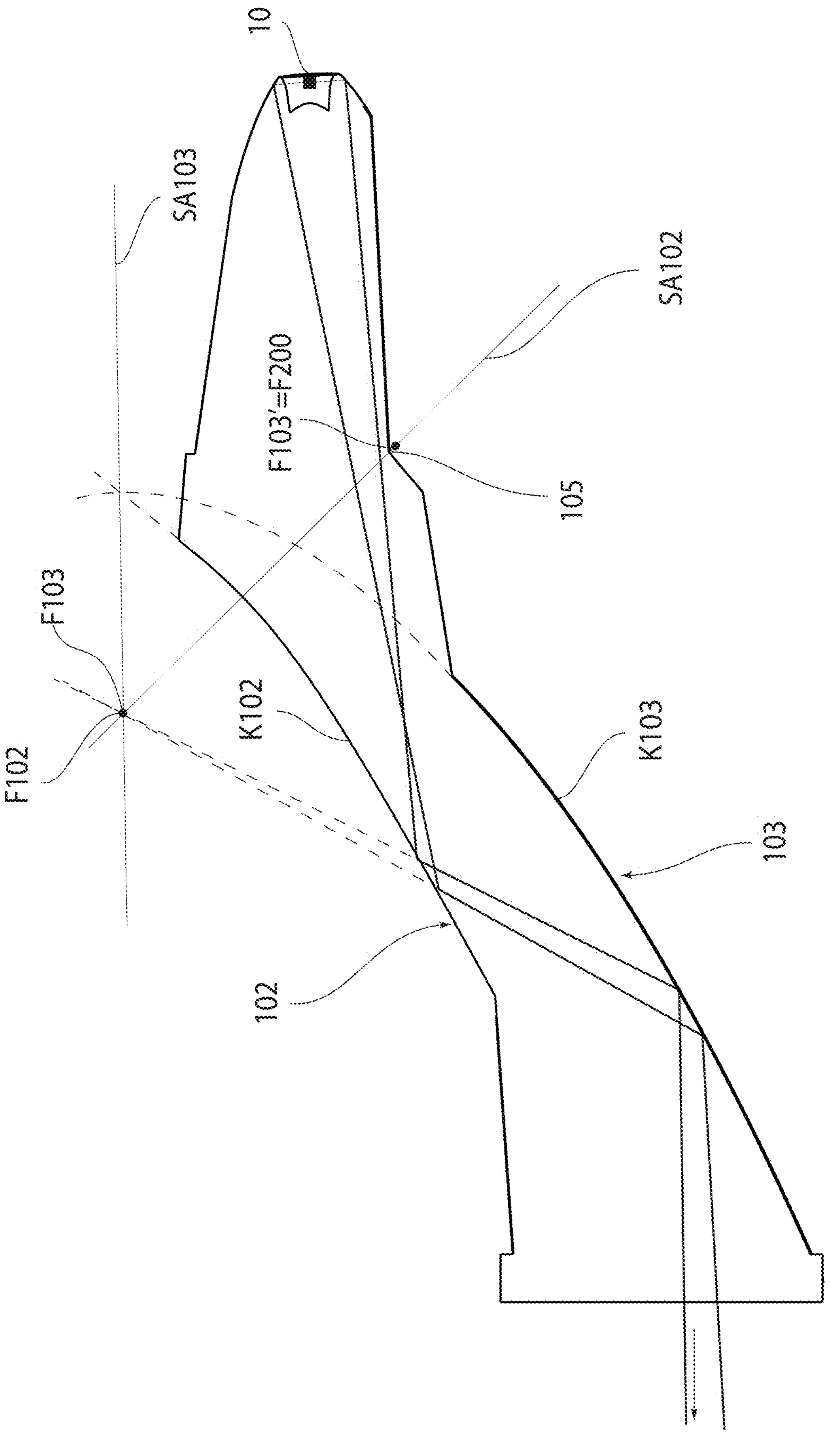
FIG. 1A shows the lighting device from FIG. 1 with a focus on geometric aspects.
Figure 1B:
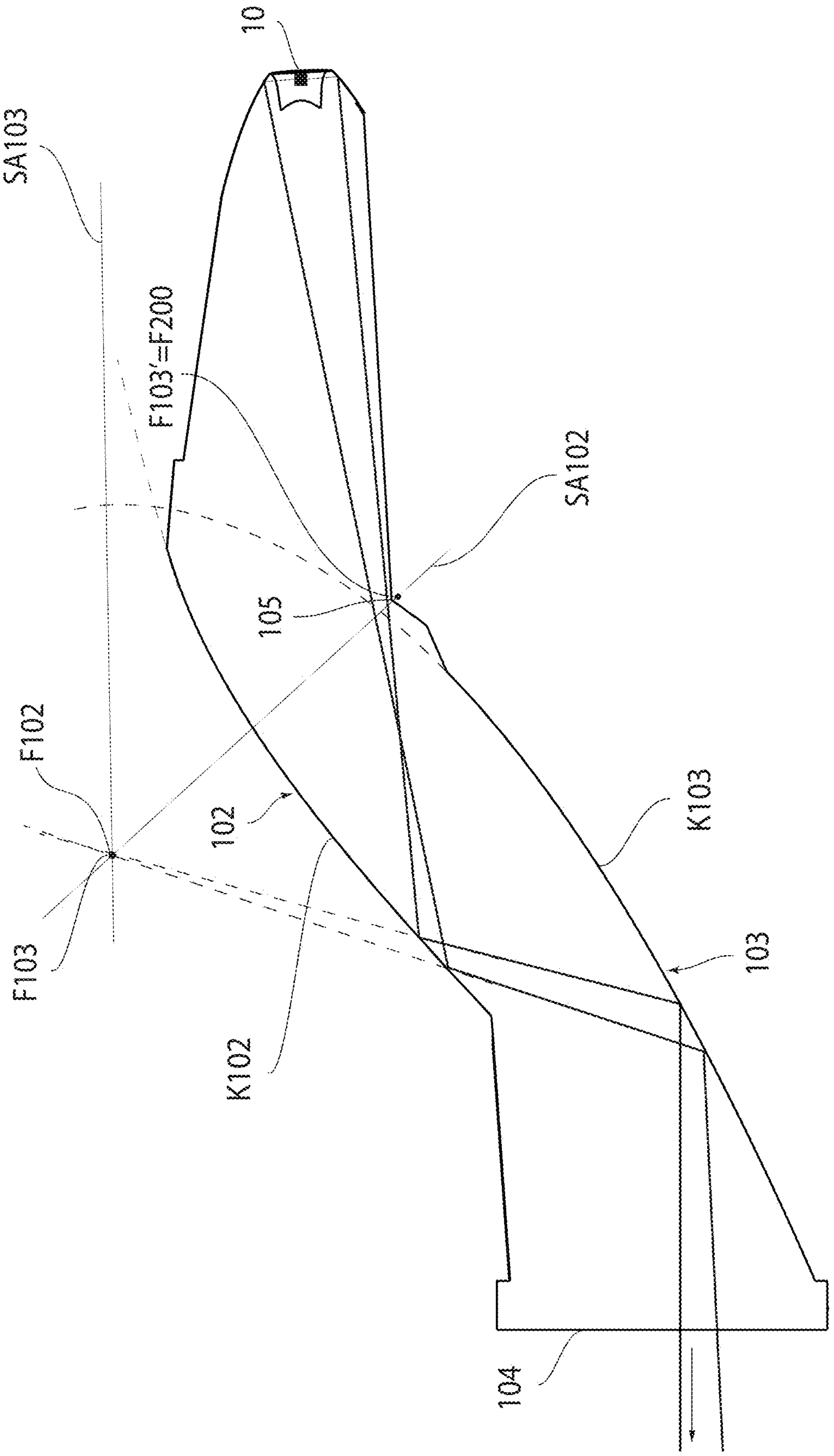
FIG. 1B shows a modification of the lighting device from FIG. 1 or FIG. 1A in a representation analogous to FIG. 1A.

FIGS. 1, 1A and 1B show the lighting device 1 in an installation position in a motor vehicle. In the examples shown in these figures, the planar light emitting surface 104 is perpendicular to a horizontal plane. In real situations, there may be a certain inclination of the light emitting surface to the horizontal plane, but this does not change the meaning of terms such as "upper", "lower", etc.

After the edge 105, the light propagates as a second light bundle (light beam S2) to the first light deflection surface 102 in a second light propagation direction Y2, the second light propagation direction Y2 being identical to the first light propagation direction Y1.

The incident light S2 is totally reflected at the first light deflection surface 102 and deflected as a third light bundle (light beam S3) to the second light deflection surface 103 in a third light propagation direction Y3. The incident light S3 is again totally reflected at the second light deflection surface 103 and deflected as a fourth light bundle (light beam S4, fourth light propagation direction Y4) to the light emitting surface 104. These light beams emerge from the light guide body via the light emitting surface 104 as a fifth light beam (light beams S5, fifth light propagation direction Y5) and are projected as light distribution LV1-LV5 in an area in front of the light guide body 100 or in front of the vehicle.

The edge 105 (also referred to as the "aperture edge") is formed by two surfaces 150, 151 on the lower side of the 1200 of the light guide body 100, which delimit it to the outside ("boundary surfaces"), whereby the two boundary surfaces 150, 151 converge in the edge 105. In the example shown, the surface 151 passes via a further boundary surface 152 into the second deflection surface 103, although the transition can also take place directly; this will not be discussed in more detail at this point, as this area is secondary or irrelevant for the mode of operation.

In the front area on the upper side 1100 of the light guide body 100, a boundary surface 154 is also shown, but this is also not described in more detail, since it is also incidental or irrelevant to the function of the invention.

Looking at the vertical section from FIG. 1, in this section through the light guide body 100, which runs parallel to the first light propagation direction Y1, the first light deflection surface 102 forms a first intersection curve K102, and the second light deflection surface 103 forms a second intersection curve K103.

In this example, the first intersection curve K102 is concave and has the shape of a branch of a hyperbola. A focal point F102 of this hyperbola, see FIG. 1A, lies outside the light guide body 100, in an area of the light guide body 100 facing away from the second light deflection surface 103.

The second intersection curve K103 is convexly curved and has the shape of a parabola with a focal point F103, wherein the focal point F103 of the parabola coincides with the focal point F102 of the first intersection curve K102, which lies outside the light guide body 100 in a region of the light guide body 100 facing away from the second light deflection surface 103.

The second intersection curve K103 is convexly curved when looking at the light guide body 100. From the perspective of the light rays propagating in the light guide body 100, the second intersection curve K103 has a concave curvature, i.e. this (totally reflective) surface or intersection curve K102 acts like a concave mirror for the light rays.

In the example shown in FIGS. 1 and 1A, the first intersection curve K102 is concave. From the perspective of the light rays moving in the light guide body 100, however, the concave first intersection curve K102 is convex.

The second focal point F103' of the hyperbola forms the total focal point F200 of the deflection system 200 formed by the first intersection curve K102 and the second intersection curve K103 in the sectional plane shown. The total focal point F200 lies in the region of the edge 105, either on the edge or in the light guide body 100 above the edge 105, or, as shown roughly schematically, in particular slightly below the edge 105, outside the light guide body 100.

The deflection system 200 consisting of the first and second deflection surfaces 102, 103 projects the light beams emitted by the light source 10 as light distribution LV1-LV5. Due to the fact that the edge 105 is located in or near the focal point F200 of the overall system, the edge 105 is depicted in the light distribution as a sharp cut-off line HDG, which limits the light distribution LV1-LV5 upwards. The shape of edge 105 determines the shape of the cut-off line HDG.

FIG. 1A also shows an axis of symmetry SA102 of the hyperbola and an axis of symmetry SA103 of the parabola. The axis of symmetry SA102 of the hyperbola runs through the two focal points F103, F103' (=F200) of the hyperbola.

In particular, the focal point F103'/F200 lies in a focal plane or Petzval surface of the deflection system or imaging system 200.

The axis of symmetry SA103 of the parabola intersects the focal point F103 of the hyperbola. It is possible that the axis of symmetry SA103 runs parallel to the light emission direction (main emission direction) of the light source.

The deflection or imaging system 200 thus forms a positive lens or converging lens.

The term "light propagation direction" refers to the resulting direction of the light rays of the respective light beam under consideration.

It may be provided that the edge 105 comprises one or more rectilinear sections, wherein, for example, in the case of two or more rectilinear sections, these are arranged offset to one another in one direction, in particular a vertical direction. Typically, the edge or its sections lie in a horizontal plane.

It may preferably be provided that the edge 105 is curved, with the edge preferably lying in a Petzval surface of the deflection system 200, being tangent to the Petzval surface of the deflection system 200, or being located in the vicinity of the Petzval surface.

Figure 2:
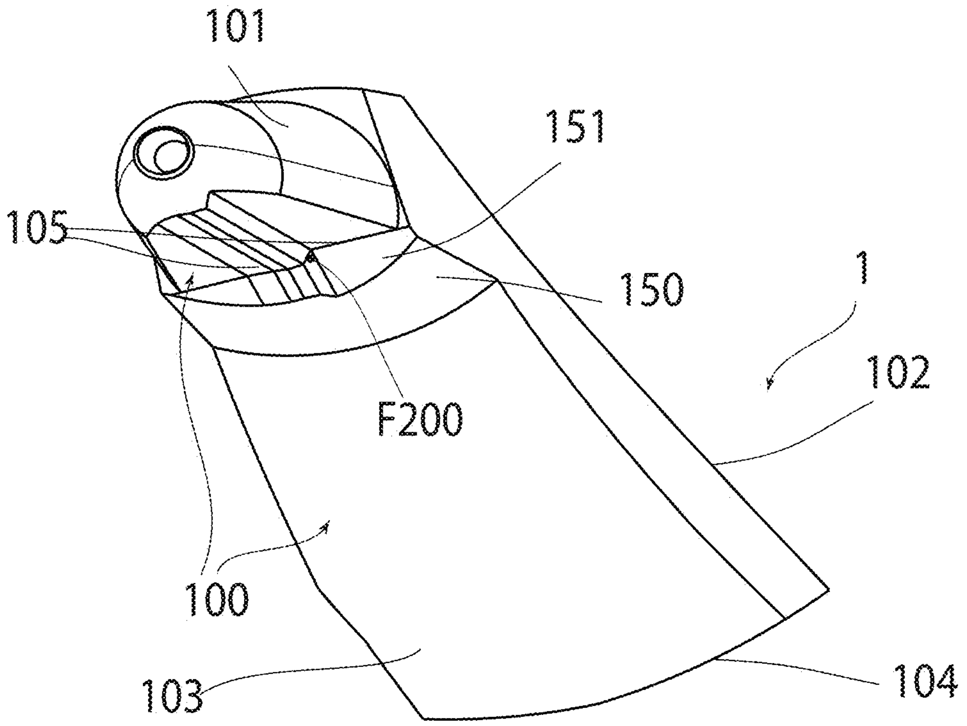
FIG. 2 is a perspective view of the lighting device from FIG. 1 or similar to that from FIG. 1 from below.

A lighting device 1 according to the invention with a light guide body 100 from FIG. 1 or similar to FIG. 1 is shown in a perspective view from the rear at an angle in FIG. 2. Here it can be seen that the aperture edge 105 consists of two vertically offset sections that are connected to each other by a further oblique section. In this way, an asymmetry in the cut-off line HDG of the light distribution LV1-LV5 can be realized. Furthermore, FIG. 2 schematically shows the position of the focal point F200 of the deflection system 200.

The two deflection surfaces result, for example, from the fact that the first intersection curves and/or the second intersection curves have identical shapes in parallel vertical sections.

Preferably, however, it is provided that in parallel vertical sections Ev the first intersection curves K102 and the second intersection curves K103 have different shapes, in particular different curvatures, and the first and second deflection surfaces 102, 103 each formed by rotation of the first and second intersection curves K102, K103 about their respective axis of symmetry SA102, SA103, for example about the respective axis of symmetry SA102, SA103 in the vertical longitudinal center plane, as shown in FIG. 1A. Analogous considerations also apply to the embodiment according to FIG. 1B, which will be discussed further below.

The light coupling region 101 is preferably in the form of a collimator, in particular a TIR collimator, which aligns the light beams fed into the light coupling region 101 from the light source 10 by means of total internal reflection. The light coupling region 101 or TIR collimator aligns the light beams in the first light propagation direction Y1. Preferably, the light beams S1 are bundled in the direction of the aperture edge 105.

The coupled light thus moves in the first light propagation direction Y1, wherein these light beams S1 are preferably bundled, i.e. converge in the direction of edge 105. In an ideal, point-shaped light source, it could be provided that the light beams are focused into the edge or into a point that lies on or close to the edge. However, due to the spatial expansion of the light source 10 in practice, light rays also move past the edge at a distance above the edge. In the light distribution, these beams passing above illuminate the area below the cut-off line HDG or the lower area of the light distribution LV1-LV5, the closer the light beams move past the edge 105, the higher up these light beams are in the light image. Edge 105 can be recognized in the light image as the cut-off line HDG, which limits the light image towards the top. Since the light beams S1 are bundled and essentially directed towards the edge, the light distribution is brightest in the area of the cut-off line and the highest illuminance values occur there.

FIG. 1B shows an illumination device 1 similar to that in FIGS. 1 and 1A. The embodiment from FIG. 1B differs in that the first intersection curve K102 is convexly curved in this example, but again has the shape of a branch of a hyperbola. A focal point F102 of this hyperbola is again located outside the light guide body 100, in an area of the light guide body 100 facing away from the second light deflection surface 103. The other relationships are analogous to FIG. 1A, which is why they will not be discussed in more detail here.

The main difference between the embodiments is that in the embodiment shown in FIG. 1/1A, the intermediate image formed at the focal point F103 is reduced in size, whereas in the embodiment shown in FIG. 1B, it is enlarged.

Figure 3:
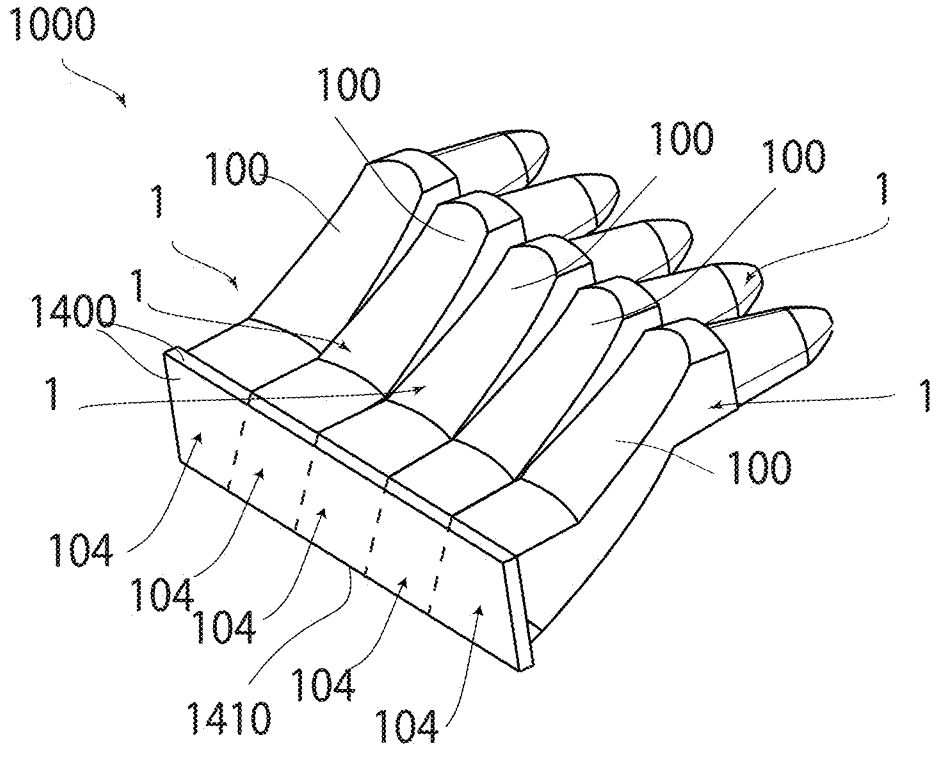
FIG. 3 shows a lighting system comprising five lighting devices similar to those in FIG. 1 in a perspective view from above.
Figure 4:
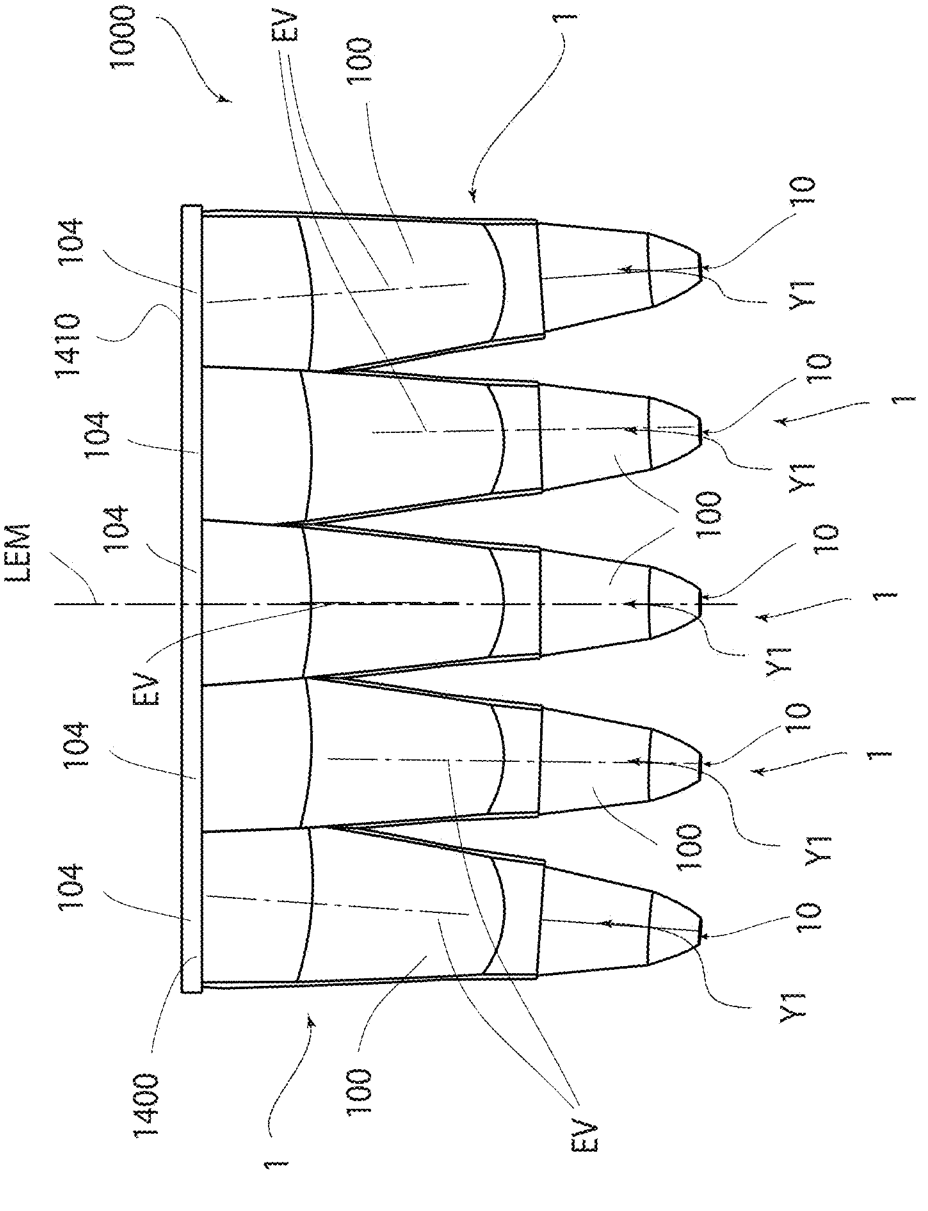
FIG. 4 is a top view of the lighting system from FIG. 3.
Figure 8:
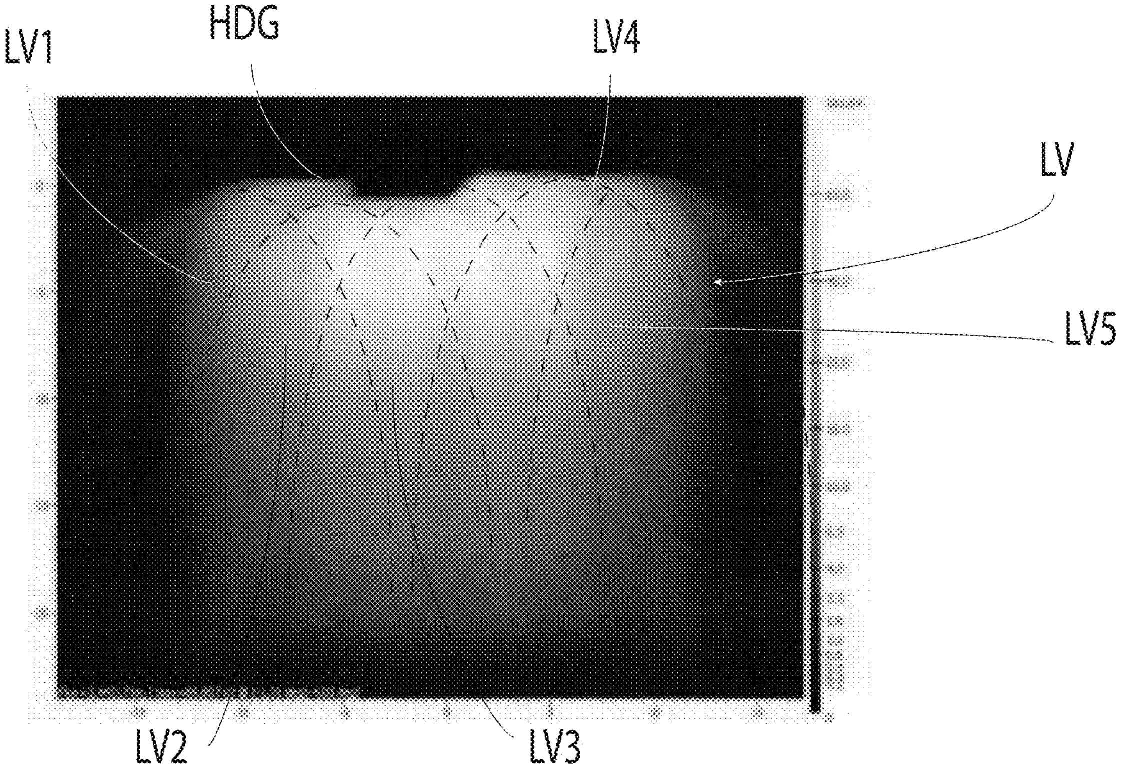
FIG. 8 shows an overall light distribution generated with a lighting system as shown, for example, in FIG. 3, 5 or 6.

FIGS. 3 and 4 show a lighting system 1000 comprising five lighting devices 1 according to the invention. These are arranged side by side and integrally connected to each other (i.e. connected in one piece). The lighting devices each have a vertical longitudinal sectional plane Ev; these can run parallel to each other, but are preferably arranged at an angle to each other so that the longitudinal sectional planes intersect in front of the lighting system 1000 when viewed in the direction of light propagation Y1. Due to the inclination of the respective longitudinal central planes LEM; Ev to each other, the light distributions LV1-LV5 are laterally offset to each other as shown in FIG. 8, so that a desired width of the light image can be realized. Neighboring light distributions preferably overlap.

The lighting devices thus each generate a light distribution LV1-LV5, which together then form the resulting overall light distribution LV, for example a dipped beam light distribution LV. Such an overall light distribution is shown schematically in FIG. 8.

The light sources 10 can be arranged in a row, in particular side by side.

The light guide bodies 100, in particular their light emitting surfaces 104, open into a common, preferably planar, system light emitting surface 1410. In the example shown, the system light emitting surface 1410 is perpendicular to a longitudinal center plane LEM of one, in particular of the central light guide body 100.

Figure 5:
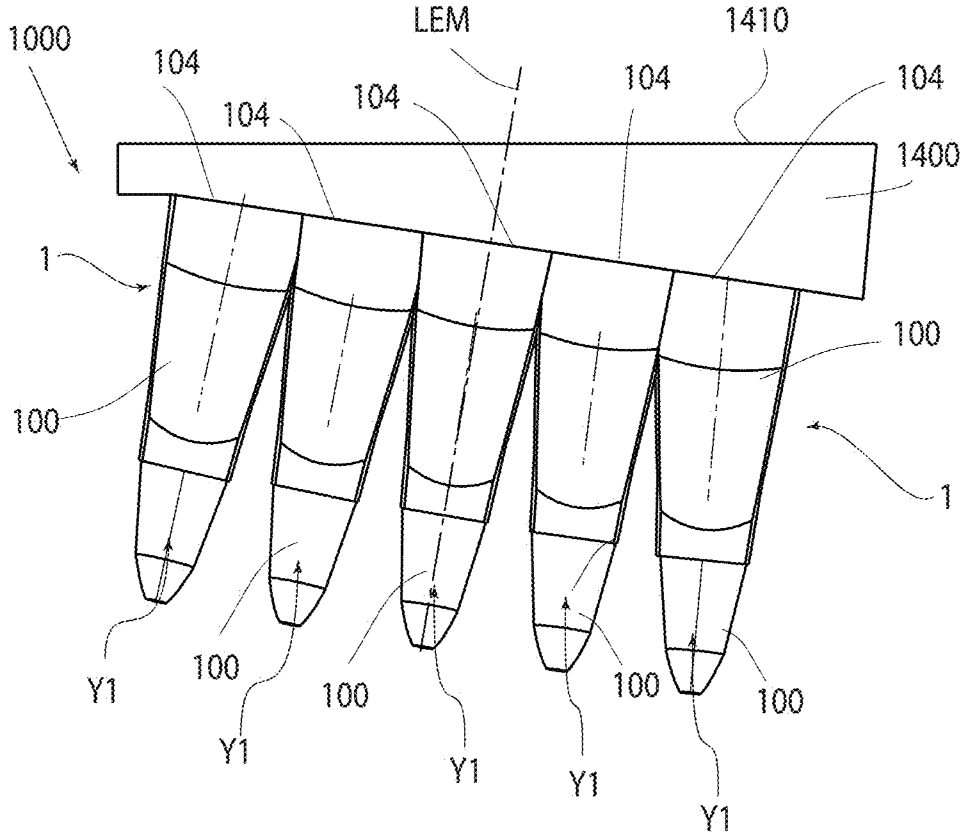
FIG. 5 shows a variation of the lighting system from FIG. 3, viewed from above.
Figure 6:
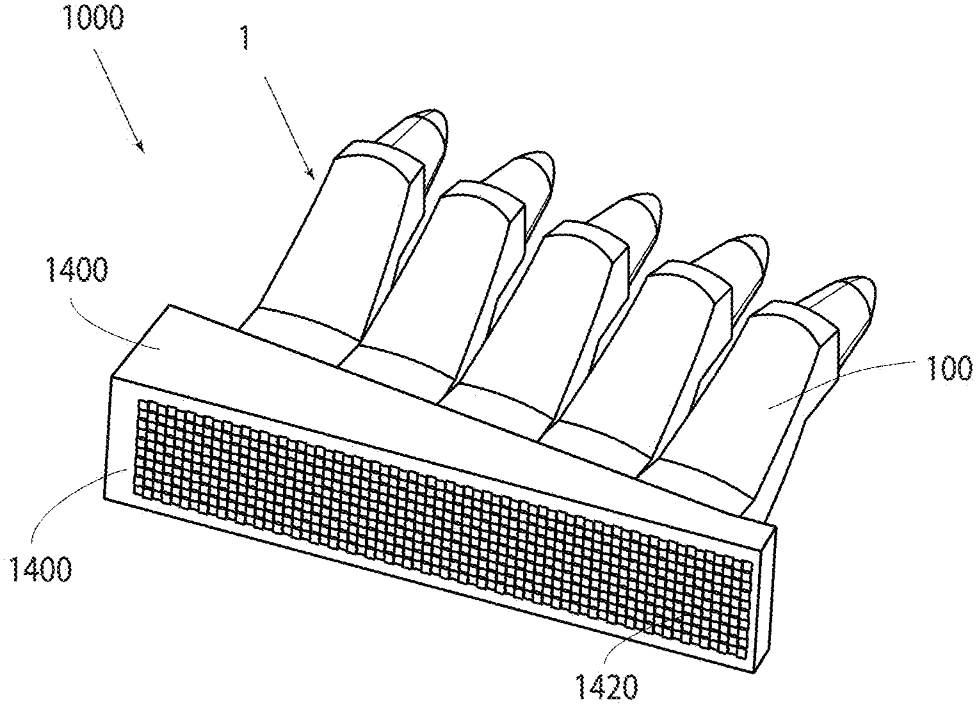
FIG. 6 shows the lighting system from FIG. 5, with cushion optics on the overall system light emitting surface, in a perspective view from above.

FIGS. 5 and 6 show an essentially analogous lighting system 1000, in which, however, the system light emitting surface 1410 extends obliquely, at an angle $\alpha$ not equal to 0° to the longitudinal center plane LEM.

As shown, the light emitting surfaces 104 in the two examples preferably open into an upstream light conducting, in particular transparent, body 1400, which is preferably formed integrally with the light guide bodies 100 and which has the system light emitting surface 1410 opposite the light emitting surfaces 104.

In order to homogenize the light emerging from a light guide body 100 or from the system light emitting surface 1410, it may be provided that cushion optics 1420 are provided on this planar light emitting surface, as shown schematically in FIG. 6. Such cushion optics 1420 are of course not limited to the embodiment according to FIG. 6.

The great advantage of a lighting device or lighting system according to the invention is that the edge/aperture edge of the deflection system is located inside the light guide body. The light coupling region, in particular the TIR collimator, the deflection system and the aperture edge can be integrally formed, i.e. in one piece, so that there are no air gaps, which are inevitably present in designs comprising lenses.

The manufacturing costs can thus be greatly reduced, as a projection lens is no longer necessary, and no tools are required. When using a lens, the light has to pass through four optical media, once starting from the light source from air to the material of the TIR collimator, the next transition from the collimator material to air, the next from air to the material of the lens and at the end from the material of the lens to air. By removing the lens from the design, half of these transitions are removed, which has a positive effect on the efficiency of the design.

That which is claimed is:

1. A lighting device (1) for a motor vehicle, the lighting device (1) comprising:

a light source (10) configured to emit light;

a transparent light guide body (100) configured to project light emitted by the light source (10) as a light distribution (LV1-LV5); and a light coupling region (101) configured to couple light emitted by the light source (10) into the light guide body (100), wherein the light guide body (100) has a first light deflection surface (102) on an upper side (1100), a second light deflection surface (103) on a lower side (1200) and a light emitting surface (104), wherein light emitted by the light source (10) and coupled into the light guide body (100) via the light coupling region (101) propagates in the light guide body (100) as a first light beam (S1) in a first light propagation direction (Y1), wherein the light guide body (100) has on a lower side (1200) an edge (105) extending transversely to the first light propagation direction (Y1), and after the edge (105), the light propagates as a second light beam (S2) to the first light deflection surface (102) in a second light propagation direction (Y2), the second light propagation direction (Y2) having the same direction as the first light propagation direction (Y1), and is deflected from the first light deflection surface (102) as a third light beam (S3) to the second light deflection surface (103) and is deflected from the second light deflection surface (103) as a fourth light beam (S4) to the light emitting surface (104), exits via the light emitting surface (104) as a fifth light beam (S5) and is projected as a light distribution (LV1-LV5) in an area in front of the light guide body (100), wherein in one or more sections through the light guide body (100) along one or more vertical sectional planes (Ev) which run parallel to the first light propagation direction (Y1) or parallel to a vertical longitudinal center plane (LEM), the first light deflection surface (102) forms a first intersection curve (K102) in the sectional plane or planes (Ev), and the second light deflection surface (103) forms a second intersection curve (K103), wherein the first intersection curve (K102) is convexly or concavely curved and has the shape of a branch of a hyperbola, wherein a focal point (F102) of the hyperbola lies outside the light guide body (100), in a region of the light guide body (100) facing away from the second light deflection surface (103), and the second intersection curve (K103) is convexly curved and has the shape of a parabola with a focal point (F103), the focal point (F103) of the parabola coinciding with the focal point (F102) of the first intersection curve (K102) lying outside the light guide body (100) in a region of the light guide body (100) facing away from the second light deflection surface (103), wherein the total focal point (F200) of the deflection system (200) formed by the first deflection surface (102) and the second deflection surface (103) is arranged in the sectional plane or planes (Ev) at the edge (105) or in a region of the edge (105) in such a way that the deflection system (200) consisting of the first and second deflection surfaces (101, 102) projects the light beams emitted by the light source (10) as a light distribution (LV1-LV5) with a cut-off line (HDG) which limits the light distribution (LV1-LV5), in particular upwards, wherein the cut-off line (HDG), in particular the shape and/or position of the cut-off line (HDG), is determined by the edge (105), and wherein the light emitting surface (104) is planar.

2. The lighting device (1) according to claim 1, wherein the edge (105) comprises one or more rectilinear sections.

3. The lighting device (1) according to claim 1, wherein the edge (105) is curved.

4. The lighting device (1) according to claim 3, wherein the edge (105) comprises one or more sections, wherein in the case of two or more sections these are arranged offset to one another in one direction.

5. The lighting device (1) according to claim 1, wherein in parallel vertical sectional planes (Ev), the first intersection curves (K102) and/or the second intersection curves (K103) have an identical shape.

6. The lighting device (1) according to claim 1, wherein in parallel vertical sectional planes (Ev), the first intersection curves (K102) and/or the second intersection curves (K103) have different curvatures.

7. The lighting device (1) according to claim 1, wherein the light coupling region (101) is configured, for example in the form of a collimator, such that the light beams emitted by the light source (10) are substantially aligned in the light guide body (100) in the first light propagation direction (Y1), wherein in particular the first light beam (S1) is bundled into a region above the edge (105).

8. The lighting device (1) according to claim 1, wherein the light coupling region (101) and the light guide body (100) are integrally connected to each other and are preferably formed from the same material.

9. The lighting device (1) according to claim 1, wherein cushion optics are provided on the planar light emitting surface (104).

10. A lighting system (1000) comprising two or more lighting devices (1) according to claim 1.

11. The lighting system (1000) according to claim 10, wherein the lighting devices (1) are arranged laterally next to each other, wherein, for example, the first light propagation directions (Y1) in the light guide bodies (100) are aligned parallel to each other or are inclined at an angle to each other.

12. The lighting system (1000) according to claim 10, wherein the light guide bodies (100) of the lighting devices (1) are integrally connected to each other.

13. The lighting system (1000) according to claim 10, wherein the light guide bodies (100), for example their light emitting surfaces (104), open into or form a common, preferably planar, system light emitting surface (1410), wherein the system light emitting surface (1410) extends perpendicular to a longitudinal center plane (LEM) of one of the light guide bodies (100) or obliquely, at an angle ($\alpha$), in particular a horizontal angle, not equal to 0° to this longitudinal center plane (LEM).

14. A motor vehicle headlamp comprising one or more lighting devices (1) according to claim 1.

15. A motor vehicle comprising one or more lighting devices (1) according to claim 1.

16. The lighting device (1) according to claim 2, wherein the edge (105) comprises two or more rectilinear sections arranged offset with respect to one another in one direction.

17. The lighting device (1) according to claim 16, wherein the two or more rectilinear sections are arranged offset with respect to one another in a vertical direction.

18. The lighting device (1) according to claim 3, wherein the edge stands in a Petzval surface of the deflection system (200), is tangent to the Petzval surface of the deflection system (200), or is located in the vicinity of the Petzval surface.

19. The lighting device (1) according to claim 4, wherein the edge (105) comprises two or more sections arranged offset to one another in a vertical direction.

20. The lighting device (1) according to claim 6, wherein the first and the second deflection surfaces (102, 103) are each formed by rotation of the first and second intersection curves (K102, K103) about their respective axis of symmetry.

* * * * *